Patented Feb. 6, 1934

UNITED STATES PATENT OFFICE 1,945,623

ELECTRODEPOSITION OF ALKALINE EARTH METAL COMPOUNDS ON METAL

Emil Theisz, Budapest, Hungary, assignor to Egyesült Izzólámpa és Villamossági Részvénytársaság, Ujpest, near Budapest, Hungary No Drawing. Application April 18, 1932, Serial No. 606,080, and in Hungary, Germany, and Austria April 22, 1931

13 Claims. (Cl. 204—1)

My invention refers to means for covering metal surfaces with alkaline earth metal carbonates, or with a mixture of such carbonates, with a view to producing hot cathodes for use in electrical discharge tubes. It is an object of my invention to render the production of such cathodes simpler and more efficient than was hitherto possible.

According to the present invention I connect the metallic cathode body as electrode in an aqueous solution of an alkaline earth metal compound, in which a carboxylic acid or a soluble salt thereof is dissolved and I effect the deposition of the carbonate on the body by electrolytic action, taking care that the electrolyte does not display an acid reaction which would prevent the precipitation of the carbonate.

If an aqueous solution of a carboxylic acid such as formic acid, or of a soluble salt of such acid is subjected to electrolysis, the acid radicals react at the anode under formation of carbon dioxide. In the case of formic acid or formates the reaction occurs in accordance with the equation (1) $2H.COO^- + 2\oplus \rightarrow H_2 + 2CO_2$.

At the cathode hydrogen is developed and if alkali metal or alkaline earth metal salts of organic acids are used, the hydroxides of these metals are also formed and dissolved by the electrolyte.

If the portion of the electrolyte directly surrounding the anode also contains an alkaline earth metal hydroxide, this compound immediately reacts with the carbon dioxide formed by the electrolytic current in accordance with Equation 1, whereby alkaline earth metal carbonates are precipitated on the anode surface, to which they adhere firmly.

In order to provide in the electrolyte a sufficient amount of alkaline earth metal hydroxides, I may add them to the solution as such, but I may also use an electrolyte consisting of an alkaline earth metal salt of the organic acid to be decomposed, for instance a formate. In such a case the alkaline earth metal hydroxide formed at the cathode arrives, in the course of electrolysis, also at the anode, the more readily if the solution is stirred to expedite diffusion. A preferred embodiment of my invention consists, however, in using a solution containing both an alkali metal salt of the organic acid and an alkaline earth metal hydroxide.

As the only function of the organic acid used in my process is the formation of carbon dioxide by electrolytic action, any acid answering this condition, i. e. any carboxylic acid may be used, although formic acid and its salts have proved to give the best results, the formic acid radical being decomposed in accordance with Equation 1 into carbon dioxide and hydrogen, while other carboxylic acids react under formation of carbon dioxide and hydrocarbons. If for instance propionic acid is used, the reaction occurring at the anode corresponds to the equation (2) $2CH_3.CH_2.COO^- + 2\oplus$
$CH_3.CH_2.CH_2.CH_3 + 2CO_2$, i. e. instead of hydrogen butane is formed. This butane is, however, partly subject to electrolytic oxidation, whereby less volatile products, such as for instance butyl alcohol are formed, whose presence in the electrolyte is highly undesirable.

In practising my invention I may for instance proceed as follows:

Example 1

30 grams barium formate are dissolved in 100 ccms. water and the solution is heated to 60–70° C. Into this solution an iron cathode and an anode formed by the metal body to be covered with barium carbonate are immersed, and a direct current voltage of about 2–4 volts is applied, the exact voltage being regulated to obtain an anodical current density of about 0.1 ampere per sq. cm. During electrolysis the electrolyte is kept at a temperature of 60–70° C. and continuously stirred. After some time the barium hydroxide formed at the cathode will suffice to react with the carbon dioxide developed at the anode, and the anode surface will now be covered with a thin, uniform and firmly adhering layer of barium carbonate. When this layer has attained the desired thickness, the anode is withdrawn from the solution, washed with distilled water and dried, for instance in an atmosphere of carbon dioxide.

Example 2

To the electrolyte prepared in accordance with Example 1, about 2 grams barium hydroxide are added. The electrodeposition of barium carbonate on the anode will set in immediately after the electric circuit is closed.

Instead of the solution of barium formate the formates of calcium or strontium, or a mixture of two or more of these salts may be used. In the latter case the cover produced will consist of a mixture of the corresponding carbonates, but the exact proportion of the various metals will depend on the voltage applied, on the current density, on the relation between the actual concentrations and the migration velocities of the various ions as well as on the temperature.

Instead of direct current I may also use alternating current, and specific advantages are even obtained thereby. In such a case both electrodes are electrolytically covered with the alkaline earth metal carbonate and the addition of alkaline earth metal hydroxides to the solutions already containing other formates or similar organic salts of such metals can be dispensed with.

I presume that in using alternating current each electrode becomes surrounded by a solution of the alkaline earth metal hydroxide during the half cycle, in which it acts as cathode, and that in the other half cycle this hydroxide is converted into the corresponding carbonate by the carbon dioxide developed at the same surface which then acts as anode, the advantage being that the time of one complete cycle is much too short to allow a distinct diffusion of the reaction components.

It will be understood that I do not wish to be tied down to this or any other theory of my process, the fact being that alternating current may also be used in my process and that in such a case no alkaline earth metal hydroxide need be added to avoid the initial delay occurring if direct current is applied; and that the carbonate cover will then adhere particularly firmly to the metal surface.

In investigating the frequency of the alternating current which is best suited for my process, I have ascertained that the usual frequencies of about 32–50 are altogether satisfactory, but that substantially higher frequencies, preferably above 100 and even as high as 500 give still better results, the reason being obviously that the time for losses in reaction components by diffusion is still further reduced.

Example 3

Into a solution as described with reference to Example 2 two metal bodies to be covered with barium carbonate are introduced and connected with the poles of an alternating current of about 50 cycles. The voltage and the current densities should be the same as described in Example 2. The formation of the carbonates takes place without any delay and the deposits adhere particularly firmly to the metal surfaces.

Substantially the same result is obtained if the addition of barium hydroxide is omitted, i. e. if an electrolyte as described in Example 1 is used.

As the carbonate layers obtained in accordance with my invention can be readily converted into layers of the corresponding oxides by heating the metal article in vacuo, my invention is particularly useful in producing hot oxide cathodes for electric discharge tubes, in which heating of the cathodes in vacuo is indispensable. Hot cathodes produced in this way are highly advantageous in view of their high emission and in view of their long life.

Various changes may be made in the details disclosed in the foregoing specification without departing from the invention or sacrificing the advantages thereof.

I claim:—

1. The method of depositing alkaline earth metal carbonates on metal comprising connecting said metal as electrode in an aqueous non-acid solution containing alkaline earth metal cations and carboxylic acid anions and passing a current through said solution in a manner to cause deposition of the carbonate on the electrode.

2. The method of depositing alkaline earth metal carbonates on metal comprising connecting said metal as anode in an aqueous non-acid solution containing alkaline earth metal cations, and carboxylic acid anions and passing current through said solution.

3. The method of depositing alkaline earth metal carbonates on metal comprising connecting said metal as anode in an aqueous non-acid solution containing cations of two alkaline earth metals and carboxylic acid anions and passing current through said solution.

4. The method of depositing alkaline earth metal carbonates on metal comprising connecting said metal as anode in an aqueous non-acid solution containing alkaline earth metal cations and anions of formic acid and passing current through said solution.

5. The method of depositing alkaline earth metal carbonates on metal comprising connecting said metal as anode in an aqueous non-acid solution containing cations of two alkaline earth metals and anions of formic acid and passing current through said solution.

6. The method of depositing alkaline earth metal carbonates on metal comprising connecting said metal as anode in an aqueous non-acid solution containing barium formate and passing current through said solution.

7. The method of depositing alkaline earth metal carbonates on metal comprising connecting said metal as anode in an aqueous non-acid solution containing an alkaline earth metal salt of a carboxylic acid and an alkaline earth metal hydroxide and passing current through said solution.

8. The method of depositing alkaline earth metal carbonate on metal comprising connecting said metal as anode in an aqueous non-acid solution containing barium formate and barium hydroxide and passing current through said solution.

9. The method of depositing alkaline earth metal carbonate on metal comprising connecting said metal as anode in an aqueous non-acid solution containing alkaline earth metal cations and carboxylic acid anions and passing direct current through said solution.

10. The method of depositing alkaline earth metal carbonates on metal comprising connecting said metal as electrode in an aqueous non-acid solution containing alkaline earth metal cations and carboxylic acid anions and passing alternating current through said solution.

11. The method of depositing alkaline earth metal carbonates on metal comprising connecting said metal as electrode in an aqueous non-acid solution containing an alkaline earth metal salt of a carboxylic acid and an alkaline earth metal hydroxide and passing alternating current through said solution.

12. The method of depositing alkaline earth metal carbonates on metal comprising connecting two metal pieces as electrodes in an aqueous non-acid solution containing alkaline earth metal cations and carboxylic acid anions and passing alternating current through said solution.

13. The method of depositing alkaline earth metal carbonates on metal comprising connecting two metal pieces as electrodes in an aqueous non-acid solution containing alkaline earth metal cations and carboxylic acid anions and passing alternating current of a frequency of about 500 through said solution.

EMIL THEISZ.